US012693687B2

(12) United States Patent
Cai et al.

(10) Patent No.: US 12,693,687 B2
(45) Date of Patent: Jul. 28, 2026

(54) MASEP: THE MARINE AUTOMATIC SWARM EXPERIMENT PLATFORM

(71) Applicant: Georgia Tech Research Corporation, Atlanta, GA (US)

(72) Inventors: Jinzhi Cai, Atlanta, GA (US); Scott Mayberry, Atlanta, GA (US); Fumin Zhang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 19/174,623

(22) Filed: Apr. 9, 2025

(65) Prior Publication Data
US 2025/0315066 A1 Oct. 9, 2025

Related U.S. Application Data

(60) Provisional application No. 63/631,583, filed on Apr. 9, 2024.

(51) Int. Cl.
G05D 1/69 (2024.01)
G05D 1/243 (2024.01)

(52) U.S. Cl.
CPC .............. G05D 1/69 (2024.01); G05D 1/243 (2024.01)

(58) Field of Classification Search
CPC .......... G05D 1/249; G05D 1/69; G05D 1/243; G05D 1/6987; G05D 2105/80; G05D 2107/29; G05D 2109/38; G05D 2111/10; G05D 2111/52; B63G 8/001; B63G 2008/004; B63G 2008/005
See application file for complete search history.

(56) References Cited

U.S. PATENT DOCUMENTS

| | | | | |
|---|---|---|---|---|
| 9,821,894 | B2 * | 11/2017 | Brizard | G01V 1/24 |
| 10,562,432 | B2 * | 2/2020 | Chelian | B60P 1/5404 |
| 12,204,960 | B2 * | 1/2025 | Barter | B25J 9/1605 |
| 12,240,112 | B2 * | 3/2025 | Ratliff | B25J 9/1602 |
| 2016/0194065 | A1 * | 7/2016 | Pascal | B63G 8/001 |
| | | | | 114/312 |
| 2025/0052356 | A1 * | 2/2025 | Zhou | B63C 11/52 |
| 2026/0097490 | A1 * | 4/2026 | He | B25J 9/163 |

OTHER PUBLICATIONS

Duarte et al., Application of swarm robotics systems to marine environmental monitoring, 2016, IEEE, p. 1-8 (Year: 2016).*
Robots for Environmental Monitoring: Significant Advancements and Applications, 2012, IEEE, p. 1-16 (Year: 2012).*
Dunbabin et al., Edwards, Oceans Are a Testbed for Signal Processing-Driven Technologies [Special Reports], 2013, IEEE, p. 1-4 (Year: 2013).*
Bennis et al., Short-range and Long-range Cooperative Communication for Littoral Environment Monitoring, 2019, IEEE, p. 1958-1963 (Year: 2019).*

* cited by examiner

*Primary Examiner* — Mcdieunel Marc
(74) *Attorney, Agent, or Firm* — TROUTMAN PEPPER LOCKE LLP; Ryan A. Schneider; Korbin M. Blunck

(57) ABSTRACT

A marine automatic swarm experiment platform (MASEP) system, comprising a plurality of marine robots, an aquatic testbed, and a server. Each of the plurality of marine robots can comprise one or more sensors configured to sense one or more conditions in an environment. The aquatic testbed is configured to generate position data indicative of a real-time position of each of the plurality of marine robots. The server is configured to receive sensor information from the plurality of robots and the position data from the testbed.

20 Claims, 6 Drawing Sheets

MASEP: THE MARINE AUTOMATIC SWARM EXPERIMENT PLATFORM

CROSS-REFERENCE TO RELATED APPLICATIONS

This application claims the benefit of U.S. Provisional Application Ser. No. 63/631,583, filed on 9 Apr. 2024, which is incorporated herein by reference in its entirety as if fully set forth below.

FIELD OF THE DISCLOSURE

The various embodiments of the present disclosure relate generally to robotic systems and more particularly to marine swarm robotic systems.

BACKGROUND

In recent years, underwater robotics has become an important tool for performing a wide range of marine tasks. These tasks include marine exploration, environmental surveillance, and the maintenance and monitoring of intricate undersea infrastructures. With the increasing challenges posed by underwater environments, swarm robotics is emerging as a promising solution. Swarm robotic systems offer advantages over single-robot systems, including higher tolerance to catastrophic failures and the ability to cover larger areas in less time. However, underwater swarm robotics face unique challenges, including communication requirements increasing as the size of the swarm grows and the high cost of developing the control system of swarm robotic system.

Physical simulation platforms (testbeds) have become indispensable tools for researchers, offering a controlled environment for in-depth studies on collaboration strategies, navigational protocols, and task distribution among robotic swarms. These platforms reduce the operational risks and substantial costs associated with real-world underwater expeditions. Existing solutions like BudgetROV offer low-cost alternatives for large-scale group perception applications and have proven useful in educational settings. The BudgetROV is an under 300-dollar small-scale AUV system built for education purposes. Other research has introduced prototypes for autonomous surface vehicles (ASVs) designed to accommodate swarming applications and motion stabilization. The BlueSwarm which was developed by MIT researchers is a good platform that enables fish-like swarm simulation in indoor settings. The newest version of the fish in BlueSwarm system includes two cameras on each side of the system. However, these designs often have limitations, such as restricted testing dimensions, unable to show three-degree motion and real-time communication with each robot.

BRIEF SUMMARY

An exemplary embodiment of the present disclosure provides a marine automatic a marine automatic swarm experiment platform (MASEP) system, comprising a plurality of marine robots, an aquatic testbed, and a server. Each of the plurality of marine robots can comprise one or more sensors configured to sense one or more conditions in an environment. The aquatic testbed can be configured to generate position data indicative of a real-time position of each of the plurality of marine robots. The server can be configured to receive sensor information from the plurality of robots and the position data from the testbed.

In any of the embodiments disclosed herein, the aquatic testbed can comprise an aquatic tank and a vision-based localization system configured to generate the position information indicative of a position of each of the plurality of marine robots in the aquatic tank.

In any of the embodiments disclosed herein, the vision-based localization system can comprise a plurality of cameras.

In any of the embodiments disclosed herein, at least one of the plurality of cameras can be disposed at a bottom of the aquatic tank.

In any of the embodiments disclosed herein, each of the plurality of marine robots can comprise a visual identification marker.

In any of the embodiments disclosed herein, the visual identification marker can be an ArUco marker.

In any of the embodiments disclosed herein, each of the plurality of marine robots can comprise a controller disposed in an interior chamber of the respective robot, and the interior chamber can be permanently sealed from an external environment.

In any of the embodiments disclosed herein, each of the plurality of marine robots can comprise a transceiver, and each of the plurality of plurality of robots can be configured to transmit, via the transceiver, sensor information to the server and/or another robot.

In any of the embodiments disclosed herein, the transceiver can be configured to communicate with the server and/or another robot via a WiFi wireless communication protocol.

In any of the embodiments disclosed herein, the position information can comprise depth and orientation information of each of the plurality of robots.

In any of the embodiments disclosed herein, the server can be configured to issue commands to the plurality of robots to control sensors and/or motors of the robots.

In any of the embodiments disclosed herein, the aquatic testbed can comprise wave and/or current generation systems configured to generate waves and/or currents, respectively, in an aquatic tank of the testbed.

In any of the embodiments disclosed herein, the plurality of marine robots can be untethered marine robots.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figures 1, 2:
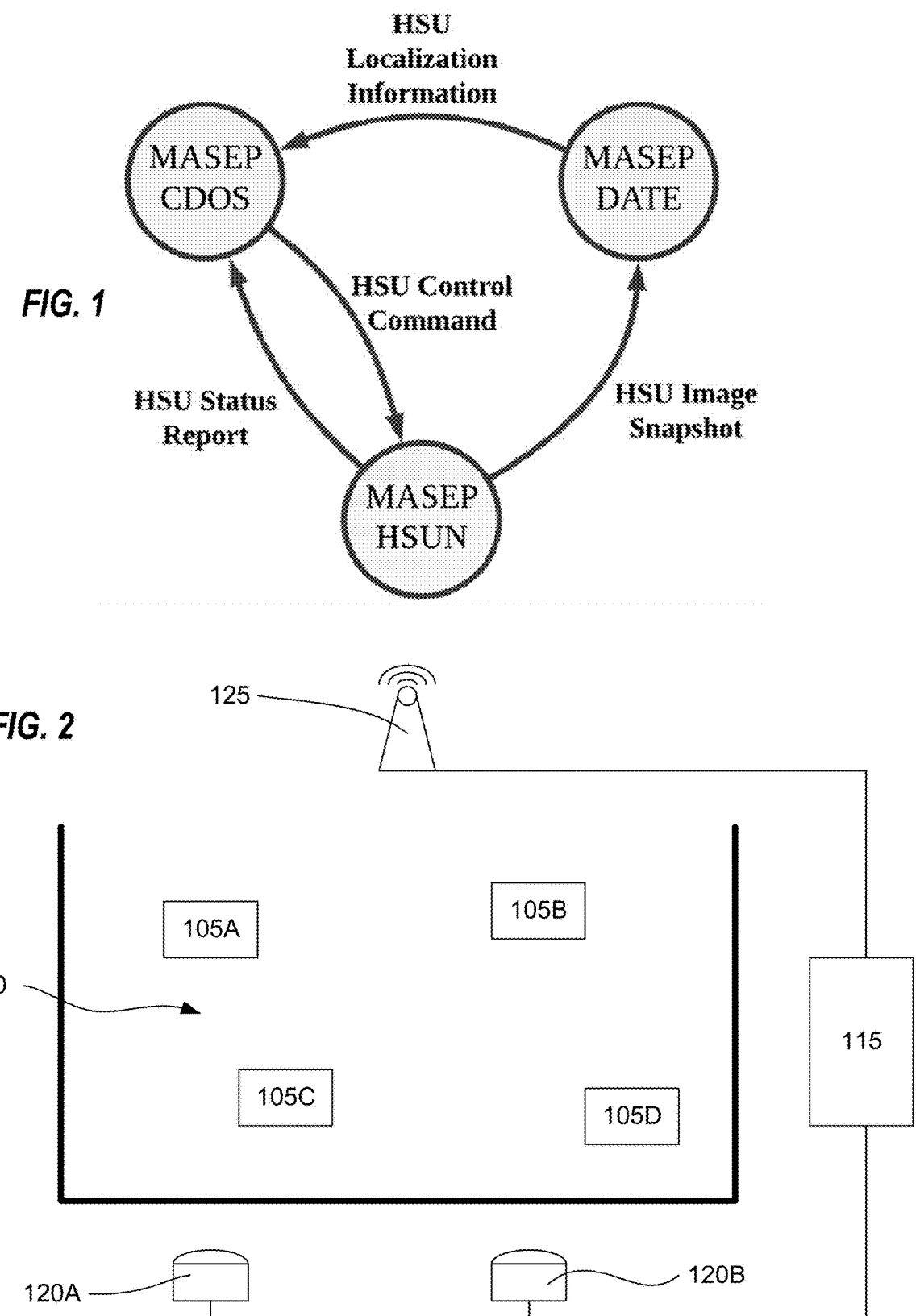
FIG. 1 provides a system diagram for a Marine Automatic Swarm Experiment Platform (MASEP), in accordance with some embodiments of the present disclosure.
FIG. 2 provides a schematic diagram of a MASEP, in accordance with some embodiments of the present disclosure.

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, member, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The materials described as making up the various members of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

The present disclosure introduces the Marine Automatic Swarm Experiment Platform (MASEP), a purpose-built physical simulation testbed tailored for the study of underwater swarm robotics. MASEP can operate as a tangible system, featuring miniature marine robots that navigate within a specifically defined, tabletop aquatic environment while engaging interactively with a central processing server. This server can be equipped with visual localization capabilities to ensure precise tracking and effective management of the robotic swarm.

The disclosure below delineates developmental aspects of MASEP, with particular emphasis on the design and functionality of the robotic units, the visual localization system, and the overall setup of the aquatic environment.

System Overview

Designed for marine robotics research, MASEP embodiments of the present disclosure can provide a compact, tabletop-sized, aquatic multi-agent testbed environment. As shown in FIG. 1, in some embodiments, MASEP comprises three subsystems: the Hydro Swarm Unit Network (HSUN) of marine robots, the Command & Data Operations Server (CDOS), and the Dynamic Aquatic Test Environment (DATE). The HSUN can comprise a fleet of miniature marine robots, referred to herein as MASEP Hydro Swarm Units (HSUs), that navigate within the confined aquatic testbed called the Dynamic Aquatic Test Environment (DATE). The DATE aquatic testbed can comprise a vision-based localization system that measures the location of each MASEP HSU in real time. These units and the DATE can consistently relay real-time status updates to the MASEP Ground Station, which can be a dedicated desktop computer equipped to execute sensor fusion and control algorithms.

FIG. 2 provides a schematic diagram of an exemplary MASEP system. As shown in FIG. 2, the MASEP system can comprise a plurality of marine robots 105A-D disposed within an aquatic tank 110 of an aquatic testbed. The testbed can comprise a vision-based localization system which can comprise a plurality of cameras 120A-B. As shown in FIG. 2, in some embodiments, one or more of the cameras 120A-B can be disposed at a bottom of the aquatic tank 110, facing upwards towards the tank 110. Each of the plurality of marine robots 105A-D and the cameras 120A-B can be configured to communicate with a server 115. Communication between the server and other components (e.g., marine robots 105A-D, cameras 120A-B, etc.) can be via wired or wireless communication. For example, in some embodiments, the marine robots 105A-D can comprise wireless transceivers allowing for communication between and among the server and marine robots 105A-D via a WiFi antenna 125. As explained in more detail below, the vision-based localization system, including cameras 120A-B, can generate position data indicative of a real-time position of each of the plurality of marine robots 105A-D. This data can be transmitted, via the WiFi antenna 125, to the server 115, where the data can be processed, including to make a determination of specific position, depth, and/or orientation of the marine robots 105A-D in the aquatic tank 110. Similarly, the server 115 can issue commands to the marine robots 105A-D to control sensors and/or motors of the robots 105A-D.

Though not shown in FIG. 2, in some embodiments, the aquatic testbed can comprise wave and/or current generation systems to generate waves and/or currents, respectively, in the aquatic tank to simulate various marine environmental conditions. The wave and current generation systems can include be any such systems known in the art and can include one or more pumps, actuators, or combinations thereof. Additionally, though also not shown in FIG. 2, the aquatic testbed can comprise other systems for manipulating various marine environment parameters, including, but not limited to, pressure regulators, heaters, chillers, and the like.

Hydro Swarm Unit Network (HSUN)

The MASEP HSUN system can comprise multiple miniature marine robots named MASEP Hydro Swarm Units (HSUs). The MASEP HSUN can serve as the cornerstone of the compact, desktop-level marine swarm research platform. The marine robots can be untethered marine robots. As used herein, the term "untethered marine robots" refers to an autonomous or remotely operated underwater vehicle capable of navigating and performing tasks within aquatic or marine environments without the necessity of a physical wired connection to a remote controller. This vehicle can operate independently of a control cable, utilizing wireless communication, onboard sensors, and pre-programmed instructions to execute its missions, thereby enabling greater operational range and maneuverability.

Figure 3:
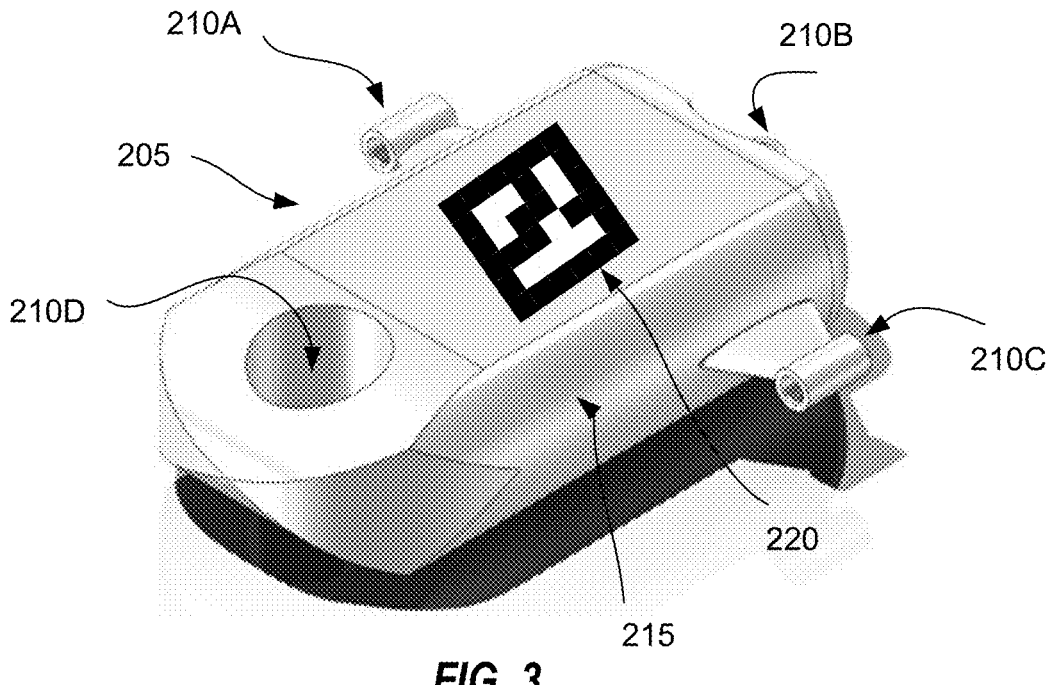
FIG. 3 provides a marine robot, in accordance with some embodiments of the present disclosure.

FIG. 3 provides an exemplary untethered HSU marine robot, in accordance with some embodiments of the present disclosure. As shown in FIG. 3, the marine robot can comprise a body 205. One or more motors 210A-D (which can include propellers, impellers, or combinations thereof), can be disposed at various locations about the body 205. The motors can be used to allow the marine robots to move about the aquatic tank with various degree of freedom (DOF). For example, in some embodiments, the motors 210A-D can provide the robots with up to four DOF. Though, as those skilled in the art would understand, in some embodiments, one or more of the robots can include fewer motors (or one or more motors can be disabled) to limit the DOF movement of the robot. For example, in some embodiments, each robot can be capable of four DOF, but motors can be controlled to limit the robot to, e.g., three DOF, to mimic a particular type of robot.

Though not shown in FIG. 3, in some embodiments, the robots can comprise one or more sensors for measuring various parameters associated with the respective robot, other robots, the aquatic tank, or other components/equipment disposed within the tank. The sensors can be any sensors known in the art, including, but not limited to, inertial measurement units (IMUs), pressure sensors, temperature sensors, and the like. Data from the sensor(s) can be transmitted to an onboard controller (discussed below).

Each robot can comprise a controller. The controller can be any controller known in the art and can comprise a combination of hardware and software. The hardware can include any processing unit known in the art. In some embodiments, the hardware platform can comprise a microcontroller with a WiFi transceiver (ESP32) to enable real-time communication in shallow water. This microcontroller can work in tandem with an onboard nine DOF IMU sensor system to gather and preprocess pose sensor data, which can then be relayed to the MASEP CDOS server.

As shown in FIG. 3, each robot can comprise a visual identification marker that can be used to distinguish between robots in the aquatic tank. This visual identification marker can be detected by the vision-based localization system, which can then be used to determine position and/or orientation of the respective robot within the aquatic tank. The visual identification marker can be any marker that can be used to distinguish one robot from another. For example, in some embodiments, the visual identification marker can be an ArUco marker 220 for easier visual acquisition and localization. A notable issue, however, is the occasional loss of tracking by the ArUco marker system, often due to occlusion or water refraction. To overcome this, in some embodiments, a sensor fusion system can be integrated. This system can enhance localization by combining onboard IMU data with the existing localization framework, ensuring more reliable and accurate tracking.

Addressing the HSU's size constraints can pose a unique challenge for sealing components from the surrounding aquatic environment. Accordingly, in some embodiments, as shown in FIG. 3, each robot can comprise an interior chamber 215 for housing a controller and/or wireless transceiver. The interior chamber can be permanently sealed from the external aquatic environment, thus preventing water intrusion into the chamber 215. As used herein, "permanently sealed" refers to a condition in which the interior chamber of the marine robot, containing the controller, is enclosed in such a manner that it is impermeable to water and other environmental contaminants for the operational life of the robot. This sealing can be achieved through methods such as UV curing of resin or other equivalent sealing techniques, ensuring that the chamber cannot be opened or accessed without causing irreversible damage to the enclosure or the robot itself. This permanent seal is intended to provide long-term protection against water intrusion, thereby enhancing the durability and reliability of the robot in marine environments.

Multiple manufacturing methods can be utilized to manufacture the marine robots of the present disclosure. For example, in some embodiments, SLA 3D printing can be used for its innate waterproof abilities. For example, the body 205 can be fabricated using this method and the controller (e.g., PCB) and the casing can be sealed with UV resin. This approach allowed the MASEP HSU's length to stay below 10 cm while preserving its waterproof capabilities. The result is a fully functional MASEP HSU, ideally suited to meet the challenges of compact, desktop swarm robotics.

On the software side, the controllers of the MASEP HSUs can run specialized firmware. The firmware can be mainly used to manage all of the sensors running onboard and to correctly transfer information between themselves and the CDOS. It can also perform some basic data preprocessing before sending it to the MASEP CDOS.

Command & Data Operations Server (CDOS)

The Command & Data Operations Server can be the computation, data storage, and communication server running MASEP. For hardware, the CDOS can be any processing unit or combination of processing units known in the art. In some embodiments the CDOS server can be a standard desktop computer equipped with a standard consumer-grade GPU. The CDOS can be connected to DATE, where environmental and localization data can be communicated to the CDOS for processing. The CDOS hardware can share a network with the HSUs, and data between the HSUN and the CDOS can be communicated wirelessly using standard 2.4 GHz WiFi. The software package that connects everything can be the MASEP CDOS software suite.

Figure 6:
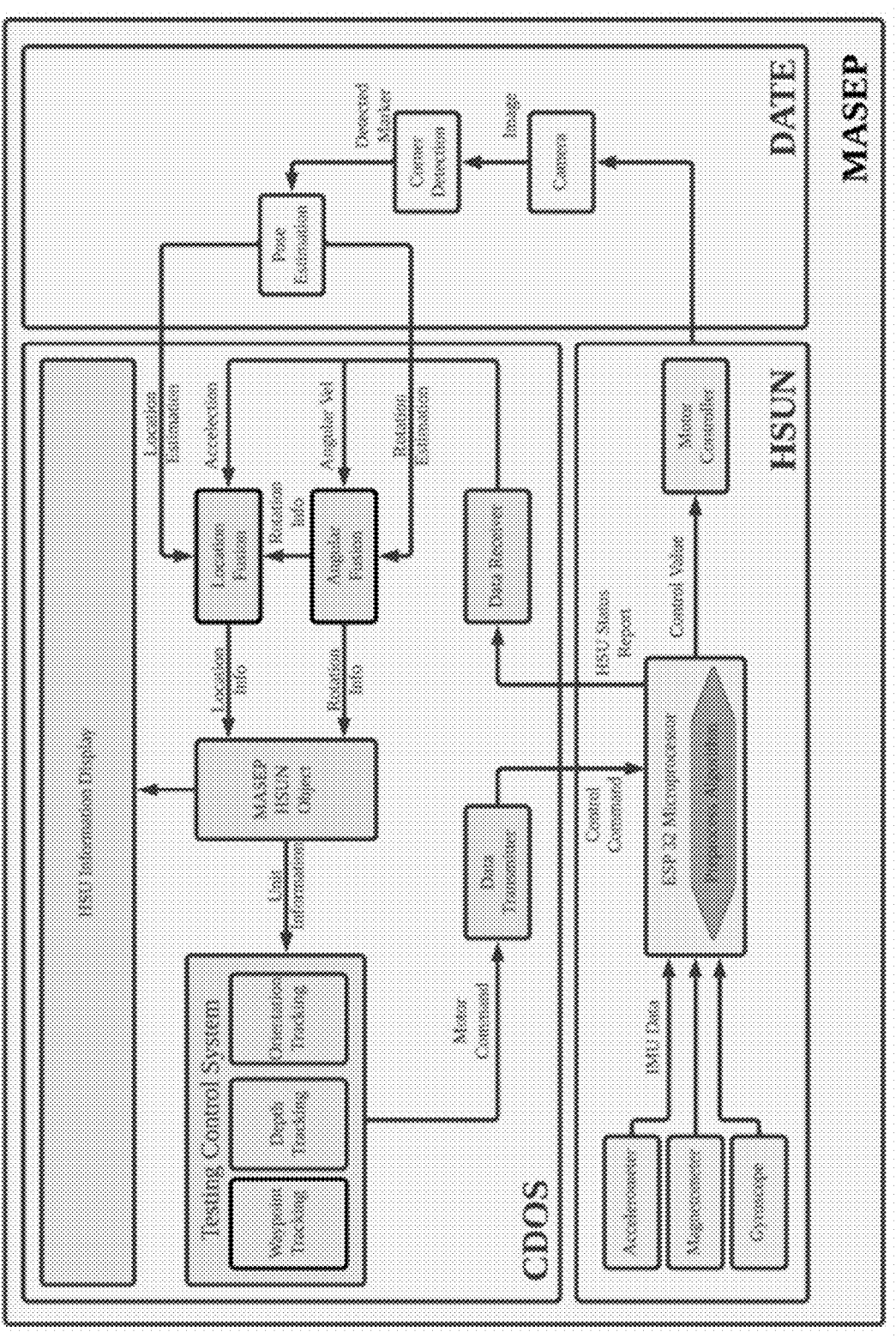
FIG. 6 provides a system diagram of a MASEP software suite, including software that runs on both a CDOS and processor in a marine robot (MASEP HSU), in which data collected by the testing environment can first undergo sensor fusion before being relayed to the control system, and the control vector can then be linearized to ensure it remains within a desired range before being transmitted to each HSU in the test environment, in accordance with some embodiments of the present disclosure.

In some embodiments, the three main tasks for the MASEP CDOS Software Suite can be sensor fusion on all information gathered by the vision localization system with the HSUN status reports, high-level filtering and control of the HSUN, and managing and monitoring the communication status for all of the MASEP HSUs and the DATE. A complete system diagram for an exemplary MASEP software suite is provided in FIG. 6. The suite includes software that runs in both the CDOS and the microprocessor in the MASEP HSU. Data collected by the testing environment can first undergo sensor fusion before being relayed to the control system. The control vector can then be linearized to ensure it remains within a desired range before being transmitted to each unit in the test environment.

The CDOS can include a built-in GUI to allow for real-time monitoring and human control. The graphing component can be designed to maintain a high update rate without interfering with other systems. At the same time, the user interface can be modular and very easy to reconstruct to fit the different stages of the development process.

Dynamic Aquatic Test Environment (DATE)

The DATE can be the aquatic testbed of the MASEP system and can comprise the aquatic tank, environmental controls, and a vision-based localization system comprising multiple cameras. The cameras can be installed at the bottom of the aquatic tank frame as shown in FIG. 2, though the present disclosure is not limited to cameras positioned only at the bottom of the tank. The DATE can utilize an ArUco Marker framework to provide precise, real-time position tracking of the MASEP HSUs within the tank. Traditional underwater localization systems often rely on acoustic methods. However, the bulkiness of acoustic devices, as well as their limited precision, can preclude their integration into the compact MASEP system. As a result, various optical/vision-based localization techniques were explored, finding that the ArUco system met desired design objectives.

Experimental Results

The below experimental results section is provided to explain capabilities and operation of an exemplary MASEP system. This section is provided for illustration purposes only, however, and should not be construed as limiting the scope of the present disclosure.

Auxiliary PID Controller

Figure 4:
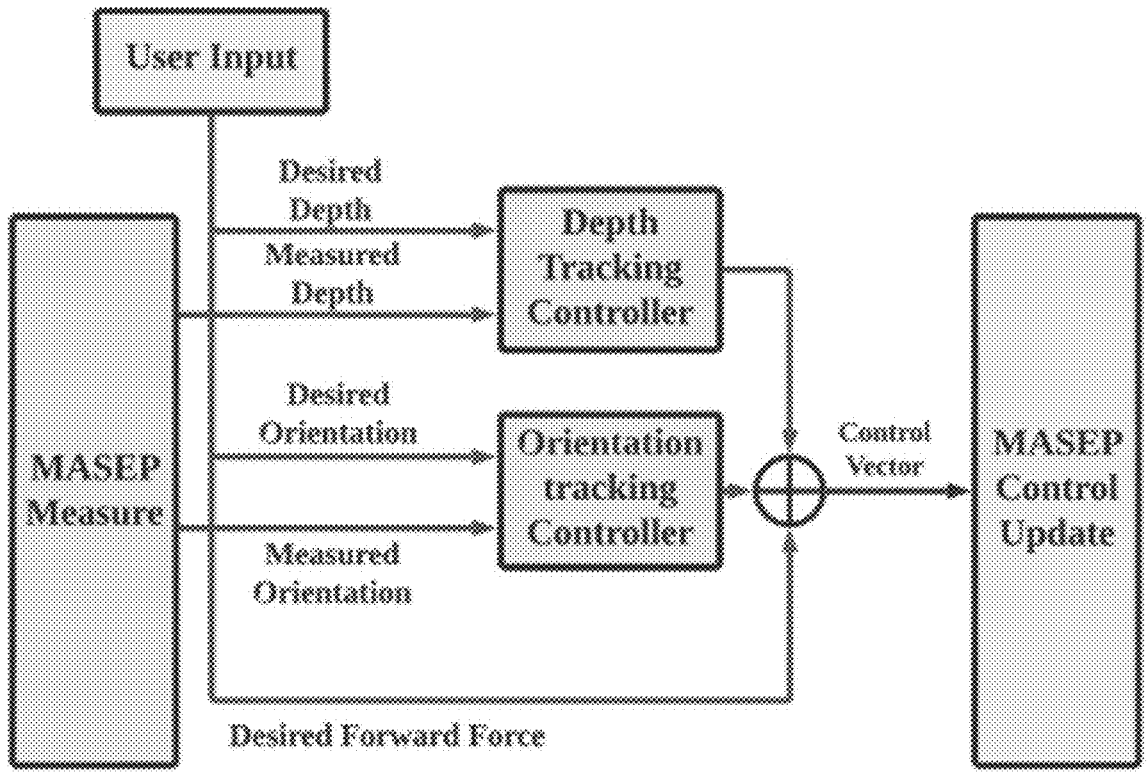
FIG. 4 provides a system diagram for a depth and orientation tracking control system, in accordance with some embodiments of the present disclosure.

The auxiliary PID controller was designed to address to solve the problem during the manual control mode. Due to the difference in force between the two horizontal motors, the HSU might not follow the desired direction of the human operator. This controller can incorporate two PID controllers for depth and orientation tracking. These controllers can leverage real-time data from the DATE and HSUs to compute the appropriate control outputs. The architecture of this exemplary control system is depicted in FIG. 4.

Through the implementation of this control system, the MASEP system's proficiency can be rigorously assessed in testing and validating control algorithms within an aquatic setting.

Figure 5:
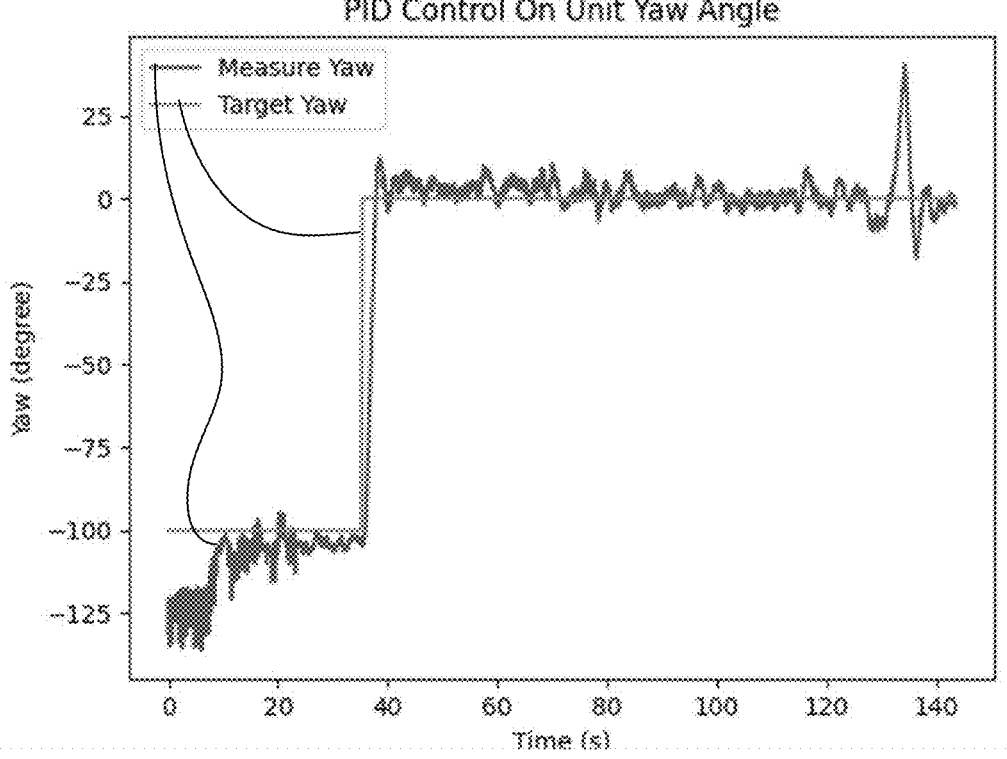
FIG. 5 provides a plot of orientation tracking behavior when a controller is applied, in accordance with some embodiments of the present disclosure.

As indicated by the orientation plot in FIG. 5, the system can exhibit some spike during the stabilizing process. After careful analysis, it has been determined that the intermittent loss of tracking on the HSUs in the DATE is primarily attributed to the limitations of the vision-based measurement system.

Feedback Linearization Waypoint Tracking Controller

Figure 8:
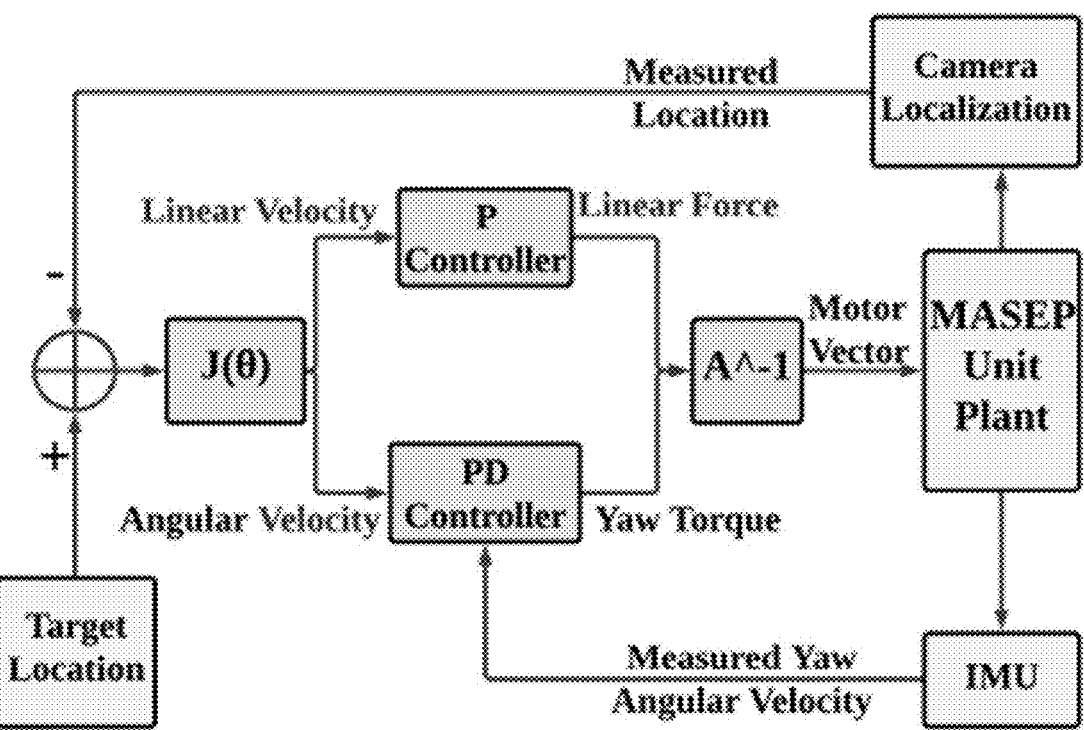
FIG. 8 provides a diagram for a feedback linearization controller design, in accordance with some embodiments of the present disclosure.

After completing the auxiliary PID controller, a way-point tracking controller can be created that can follow the predefined path. Compared with the manual controller, the automatic way-point tracking controller can be more sensitive to the discontinuity of the localization servers. To mitigate control error due to the losing tracking observed with the PID controller, a feedback linearization controller, such as the exemplary controller shown in FIG. 8, was developed, leveraging the system kinematics and sensor of the MASEP HSU. The kinematics of the MASEP HSU were simplified to three degrees of freedom (DOF): horizontal linear velocity $\dot{r}$, vertical linear velocity $\dot{d}$, and yaw orientation $\theta$. Due to the symmetrical design of the MASEP HSU, it can lack control in the Y-axis. Roll and pitch stabilization can be achieved through a weight positioned at the unit's base.

Figure 7:
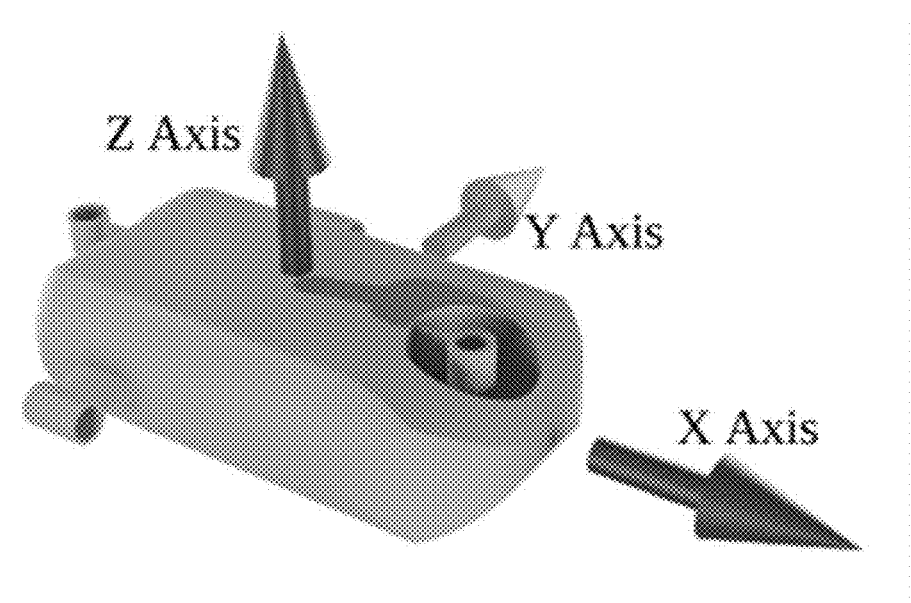
FIG. 7 provides a MASEP HSU body frame convention, in accordance with some embodiments of the present disclosure.

The conversion of the MASEP HSU coordinates from the global frame to the body frame, as depicted in FIG. 7, can be described by the following matrix equation:

$$\begin{bmatrix} \dot{r} \\ \dot{\theta} \\ \dot{d} \end{bmatrix} = \begin{bmatrix} \cos(\theta) & \sin(\theta) & 0 \\ -\sin(\theta) & \cos(\theta) & 0 \\ 0 & 0 & 1 \end{bmatrix} \begin{bmatrix} \dot{x} \\ \dot{y} \\ \dot{z} \end{bmatrix}$$

The displacement towards the target location Equation $\Delta\eta = [\Delta x\ \Delta y\ \Delta z]^T$ can be converted to the vector $v = [\dot{r}\ \dot{\theta}\ \dot{d}]^T$ in the body frame and then input into a PD controller. This controller can utilize the difference between the displacement vector and the readings from the MASEP onboard gyroscope to produce the control input, generating the force vector $F_{linear}$. The PD controller can reduce control error due to the discontinuity of localization.

The generated force vector $F_{linear}$ by the low-level controller can be converted to actual motor power using the motor conversion matrix $A^{-1}$ before being sent to each unit:

$$A^{-1} = \begin{array}{cccc} 1/2 & 1/l & 0 \\ 1/2 & -1/l & 0 \\ 0 & 0 & 1/2 \\ 0 & 0 & 1/2 \end{array}$$

Here, l represents the distance between two horizontally installed motors.

Figure 9:
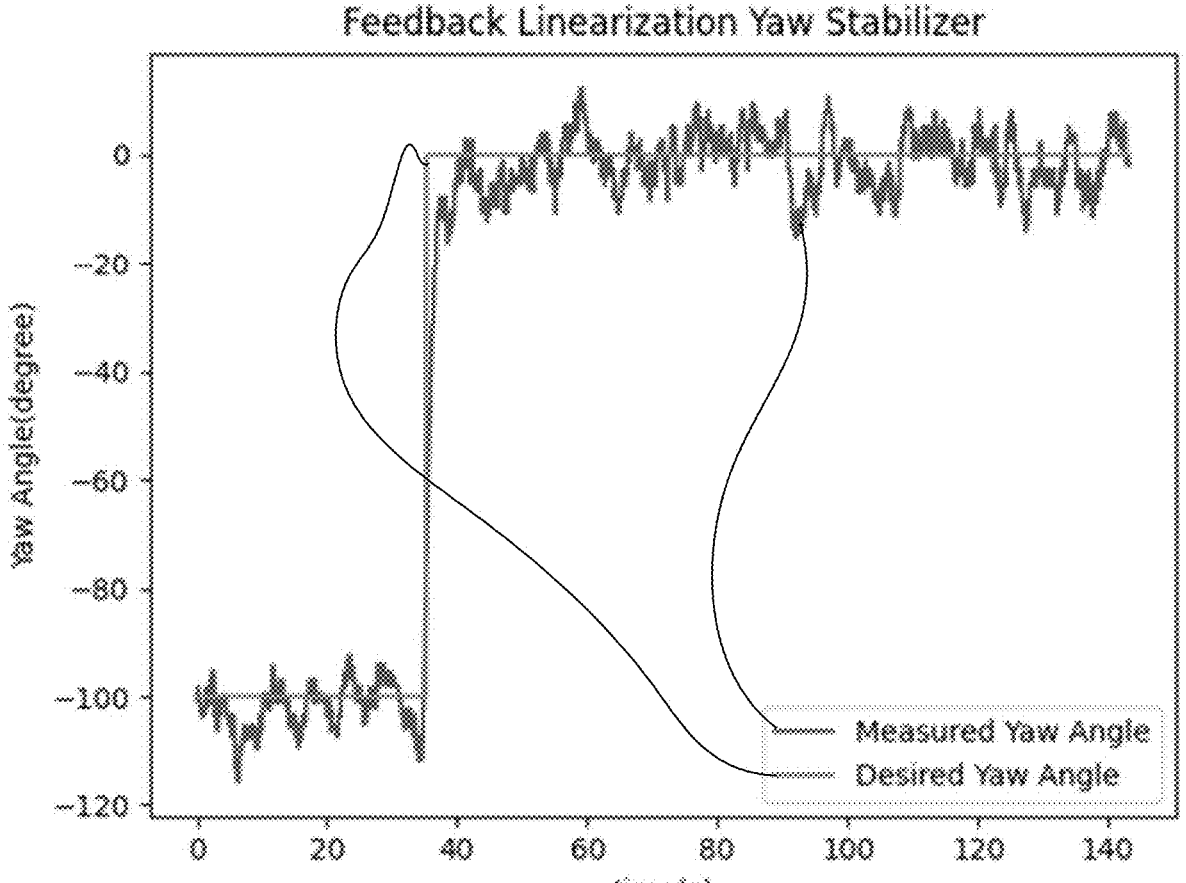
FIG. 9 provides a plot illustrating that a feedback linearization controller provide smoother turning action compared with a simple PID controller, in accordance with some embodiments of the present disclosure.

As illustrated in FIG. 9, the spike that occurs by the losing tracking can be significantly reduced compared to the PID controller. Incorporating angular velocity data into the control system can fill the gap between the two vision-based localization measurements and reduce the error caused by the discontinuity of the localization measurement. In the same test condition, the new control system has a mean squared error of 49.0088 and a standard deviation of 6.73. The old controller system has a mean squared error of 155.85 and a standard deviation of 12.29.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A marine automatic swarm experiment platform (MASEP) system, comprising:
   a plurality of marine robots, each of the plurality of marine robots comprising one or more sensors configured to sense one or more conditions in an environment;
   an aquatic testbed configured to generate position data indicative of a real-time position of each of the plurality of marine robots; and
   a server configured to receive sensor information from the plurality of robots and the position data from the testbed.

2. The MASEP system of claim 1, wherein the aquatic testbed comprises an aquatic tank and a vision-based localization system configured to generate the position information indicative of a position of each of the plurality of marine robots in the aquatic tank.

3. The MASEP system of claim 2, wherein the vision-based localization system comprises a plurality of cameras.

4. The MASEP system of claim 3, wherein at least one of the plurality of cameras are disposed at a bottom of the aquatic tank.

5. The MASEP system of claim 2, wherein each of the plurality of marine robots comprises a visual identification marker.

6. The MASEP system of claim 4, wherein the visual identification marker is an ArUco marker.

7. The MASEP system of claim 1, wherein each of the plurality of marine robots comprises a controller disposed in an interior chamber of the respective robot, the interior chamber permanently sealed from an external environment.

8. The MASEP system of claim 1, wherein each of the plurality of marine robots comprise a transceiver, and wherein each of the plurality of plurality of robots are configured to transmit, via the transceiver, sensor information to the server and/or another robot.

9. The MASEP system of claim 8, wherein the transceiver is configured to communicate with the server and/or another robot via a WiFi wireless communication protocol.

10. The MASEP system of claim 1, wherein the position information comprises depth and orientation information of each of the plurality of robots.

11. The MASEP system of claim 1, wherein the server is configured to issue commands to the plurality of robots to control sensors and/or motors of the robots.

12. The MASEP system of claim 1, wherein the aquatic testbed comprises wave and/or current generation systems configured to generate waves and/or currents, respectively, in an aquatic tank of the testbed.

13. The MASEP system of claim 1, wherein the plurality of marine robots are untethered marine robots.

14. A marine automatic swarm experiment platform (MASEP) system, comprising:
   a plurality of untethered marine robots, each of the plurality of marine robots comprising one or more sensors configured to sense one or more conditions in an environment;
   an aquatic testbed comprising an aquatic tank and a vision-based localization system configured to generate position data indicative of a real-time position of each of the plurality of marine robots in the aquatic tank; and
   a server configured to receive sensor information from the plurality of robots and the position data from the testbed.

15. The MASEP system of claim 14, wherein the vision-based localization system comprises a plurality of cameras disposed at a bottom of the aquatic tank.

16. The MASEP system of claim 14 wherein each of the plurality of marine robots comprises a visual identification marker.

17. The MASEP system of claim 14, wherein each of the plurality of marine robots comprises a controller disposed in an interior chamber of the respective robot, the interior chamber permanently sealed from an external environment.

18. The MASEP system of claim 14, wherein each of the plurality of marine robots comprise a transceiver, and wherein each of the plurality of plurality of robots are configured to transmit, via the transceiver utilizing a WiFi wireless communication protocol, sensor information to the server and/or another robot.

19. The MASEP system of claim 14, wherein the position information comprises depth and orientation information of each of the plurality of robots.

20. The MASEP system of claim 14, wherein the aquatic testbed comprises wave and/or current generation systems configured to generate waves and/or currents, respectively, in an aquatic tank of the testbed.

\* \* \* \* \*